(12) United States Patent
Smithson

(10) Patent No.: US 8,104,084 B2
(45) Date of Patent: Jan. 24, 2012

(54) AUTHORIZING A USER TO A DEVICE

(75) Inventor: Brian Smithson, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1059 days.

(21) Appl. No.: 11/594,341

(22) Filed: Nov. 7, 2006

(65) Prior Publication Data
US 2008/0109894 A1  May 8, 2008

(51) Int. Cl.
*H04L 9/32* (2006.01)
(52) U.S. Cl. .......................... 726/19; 713/168
(58) Field of Classification Search .................. 713/150, 713/155, 161, 168, 169, 170, 176; 726/2, 726/5, 9, 20, 21, 26; 380/329, 232, 247, 380/258
See application file for complete search history.

(56) References Cited

U.S. PATENT DOCUMENTS

| | | |
|---|---|---|
| 2004/0034764 A1 | 2/2004 | Bulusu et al. |
| 2004/0139028 A1 | 7/2004 | Fishman et al. |
| 2004/0268142 A1 | 12/2004 | Karjala et al. |
| 2005/0114694 A1 | 5/2005 | Wager et al. |
| 2005/0187883 A1 * | 8/2005 | Bishop et al. ................... 705/67 |
| 2006/0190995 A1 | 8/2006 | Horikiri |
| 2006/0235796 A1 * | 10/2006 | Johnson et al. ................. 705/44 |
| 2008/0066165 A1 * | 3/2008 | Rosenoer ........................ 726/5 |

OTHER PUBLICATIONS

Trusted Computing Group, Inc., "Trusted Computing Platform Alliance (TCPA)—Main Specification Version 1.1b," Copyright 2003, 322 pages.

* cited by examiner

*Primary Examiner* — Vivek Srivastava
*Assistant Examiner* — Nega Woldemariam
(74) *Attorney, Agent, or Firm* — Hickman Palermo Truong & Becker LLP; Edward A. Becker

(57) ABSTRACT

A method and apparatus for authorizing a user is provided. A requestor submits a request for challenge data to a device. The device generates the challenge data and provides the challenge data to the requestor. The requestor obtains response data that is responsive to the challenge data. The requestor may obtain the response data by providing, to a third party, the challenge data and identification information for the requestor. Upon the third party successfully validating the identity of the requestor, the third party provides the response data to the requestor. The requestor thereafter submits the response data to the device. In response to receiving the response data from the requestor, the device verifies the response data. Upon the device successfully verifying the response data, the device grants access to the requestor.

21 Claims, 4 Drawing Sheets

AUTHORIZING A USER TO A DEVICE

FIELD OF THE INVENTION

The present invention generally relates to techniques for authorizing a user to a device.

BACKGROUND

Certain functions of many electronic devices are often not accessible by general users of the device, and instead, are only accessible to an administrator of the device. For example, it would be advantageous to restrict the ability to change the configuration of a device to an administrator to prevent a mischievous user from configuring the device in an inappropriate manner. Any function provided by a device which is only intended to be accessible to an administrator shall be referred to as a restricted function.

Typically, for an administrator to access a restricted function of a device, the administrator must be authorized by the device. The act of authorizing the administrator to the device typically involves the administrator presenting some sort of credential (such as a password) to the device for evaluation by the device. If the administrator is unavailable or has forgotten or misplaced the credential, then the restricted functions of the device may not be accessible.

To address the situation where the administrator's credential is unavailable, certain devices may be configured with a reset mechanism (such as a jumper which may be interested into an internal circuit board of the device) which, when activated, resets the device to a default state, e.g., a state with a known administrator password. However, while such an approach allows the owner of the device to access the restricted functions of the device if the administrator credential is unavailable, it also allows any third party, with knowledge of the reset mechanism, access to the restricted functions of the device without the consent of the owner of the device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENT(S) OF THE INVENTION

Techniques are provided for authorizing a user to a device in a manner that does not require that the user seeking authorization be in possession of a preordained credential. Instead, a third party, such as a manufacturer of a device, performs an "out-of-band" authorization of the user seeking authorization on the device. In other words, a device may authorize a user to perform certain functions on the device if the user can prove to the device that the user has been authorized by a third party.

In an embodiment, to facilitate authorization of the user by the third party, the user requests a first set of data ("challenge data") from the device. The requestor provides the challenge data, and identification information for the requester, to a third party. Upon the third party successfully validating the identity of the requester, the third party provides another set of data ("response data") to the requestor. The requestor thereafter submits the response data to the device. In response to receiving the response data from the requestor, the device verifies the response data to ensure that the user was actually authorized by the third party. Upon the device successfully verifying the response data, the device grants access to the requestor.

Advantageously, if an administrator of a device is unavailable, another user may gain access the restricted functions of the device, even though the administrator's credentials are not available to the other user. Additionally, even though the third party is responsible for authenticating users who wish to gain access to the device, the third party does not itself have the ability to access the device.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

System Overview

Figure 1:
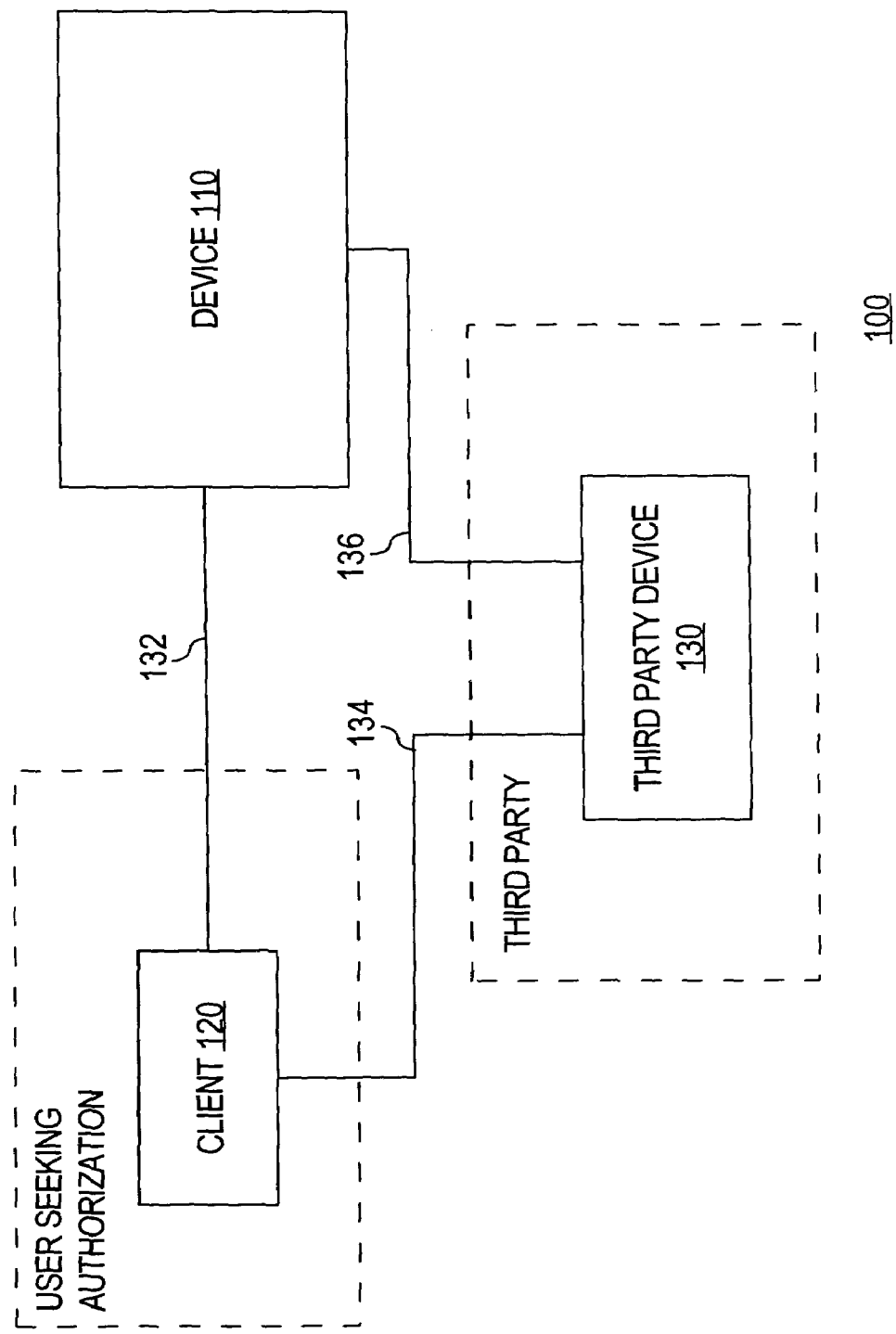
FIG. 1 is a block diagram of a system according to an embodiment of the invention.

FIG. 1 is a block diagram of a system 100 according to an embodiment of the invention. System 100 includes a device 110, and may optionally include one or more of: a client 120, a third party device 130, and communications links 132, 134, and 136. System 100 may be used to authenticate a user to device 100 without the user having possession of a preordained credential.

Device 110 may correspond to any device that is capable of performing a restricted function. A restricted function is any function, which may be performed by a device, which is accessible by one user (such as an administrator) but is not accessible to another user (such as an end user of the device). Non-limiting, illustrative examples of client 120 include a personal computer, an embedded computer, a multi-function peripheral (MFP), a printer, a facsimile machine, a scanner, and a copier.

In an embodiment, system 100 may include a client 120. Client 120 corresponds to any device which may be used by a user to communicate with device 110. For example, a user may use client 120 in sending a request for challenge data to device 110 or receiving the challenge data from client 110. Non-limiting, illustrative examples of client 120 include a personal computer, an embedded computer, a personal digital assistant (PDA), and a cell phone. Certain embodiments of the invention may not include a client 120; consequently, the presence of client 120 is optional. As illustrated in FIG. 1, client 120 is in possession of the requestor seeking authorization (hereinafter simply "the user").

In system 100, a third party performs the authorization of the user on device 110. The third party may correspond to any party capable of performing the authorization of the user. For example, the third party may correspond to the manufacturer of device 110 or any party that is in the distribution or sales path of device 110. A party that is in distribution or sales path of device 110 may include, for example, a dealer of device 110, a distributor of device 110, a value-added reseller of device 110, and a leasing company of device 110. In another example, the third party that performs the authorization of the user on device 110 may be a party that is responsible for operation or customer support of device 110, such as a managed services provider or an IT support organization of a company or organization employing the user seeking authorization.

In an embodiment, the third party that performs the authorization on the user may use third party device 130. Third party device 130 may correspond to any medium or mechanism that is capable of communicating with the user. Non-limiting, illustrative examples of third party device 130 include a server, such as a web server. As illustrated in FIG. 1, third party device 130 is in possession of third party.

Communications link 132 may be implemented by any medium or mechanism that provides for the exchange of data between client 120 and device 110. Communications link 134 may be implemented by any medium or mechanism that provides for the exchange of data between client 120 and third party device 130. Communications link 136 may be implemented by any medium or mechanism that provides for the exchange of data between third party device 130 and device 110. Examples of communications links 132, 134, and 136 include, without limitation, a network such as a Local Area Network (LAN), Wide Area Network (WAN), Ethernet or the Internet, or one or more terrestrial, satellite or wireless links.

Having described a system according to an embodiment of the invention, the performance of authorizing a user to device 110 shall be described in additional detail below.

Authorizing a User to a Device

Figure 2:
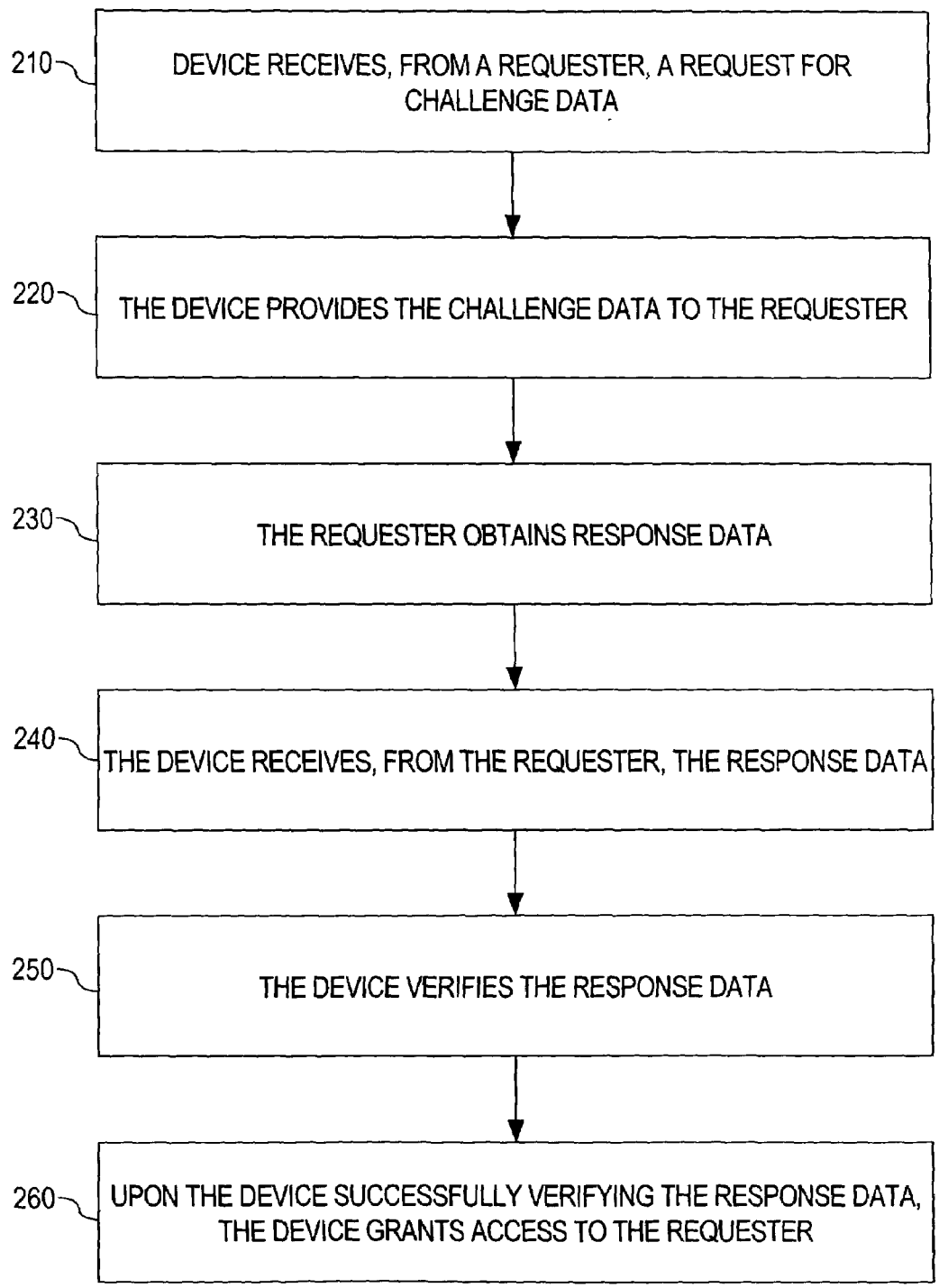
FIG. 2 is a flowchart illustrating the functional steps of an embodiment according to an embodiment of the invention.

FIG. 2 is a flowchart illustrating the functional steps of an embodiment according to an embodiment of the invention. The steps of FIG. 2 shall be explained below with reference to FIG. 1.

In step 210, device 110 receives, from the user, a request for challenge data. Challenge data may correspond to any set of data. In an embodiment, challenge data may correspond to a randomly generated string of characters. In another embodiment, challenge data may correspond to a pseudo-random string of characters, i.e., the challenge data is substantially different each time it is generated, but it need not be perfectly random in its generation. Obtaining the challenge data is useful for the user as the user will need to present the challenge data to the third data to enable the third party to authenticate the user.

In an embodiment, the user may issue the request for challenge data to device 110 through a physical interface provided by device 110. For example, the user may issue the request for challenge data through a graphical user interface provided by device 110. In another embodiment, the user may issue the request for challenge data to device 110 using client 120. For example, the user may issue the request from client 120 to device 110 over communications link 132.

In an embodiment, the request for challenge data received in step 210 may not be an express request for the challenge data, but instead, may be embodied as a request to perform a restricted function on device 110. For example, the user may perform step 210 by issuing a request to perform a restricted function to device 110. In an embodiment, a request to perform a restriction function on device 110 will only be interpreted as a request for challenge data by device 110 if the request to perform a restriction function does not accompany or precede a presentations of credentials which may be evaluated by device 110 to determine if the user has sufficient permission or authorization to perform the restricted function. After device 110 receives the request for challenge data, processing proceeds to step 220.

In step 220, device 110 generates the challenge data and provides the challenge data to the user. Device 110 may generate a different set of challenge data each time step 220 is performed. In this way, each time a user requests challenge data, the challenge data received by the user will be different.

In an embodiment, in step 220, in addition to generating challenge data, device 110 may also generate response data that is responsive to, or associated with, the challenge data. For example, the challenge data may be an encrypted version of the response data, or vice-versa. The challenge data generated by device 110 will be provided to the user, but the response data will not. The user will only be able to obtain the response data from the third party if the third party authenticates the user to use device 110. In this way, if the user supplies device 110 with the proper response data, then device 110 may be informed that the third party authenticated the user to use device 110.

In an embodiment, the challenge data generated by device 110 in step 220 may be an encrypted form of the response data generated by device 110 in step 220. For example, the challenge data may be generated by device 110 using a hardware security module (HSM). A HSM may be any combination of hardware and software, which may be incorporated within device 110, that may be used to (a) verify that device 110 is operating in the prior state that was known to be trusted, and (b) enable device 110 to access a particular algorithm if device 110 is operating in the prior state that was known to be trusted. HSM 110 may store information that identifies the prior state that was known to be trusted.

If HSM 110 successfully verifies that device 110 is operating in the prior trusted state, then HSM 110 makes available a particular algorithm (the "HSM algorithm") to device 110. The HSM algorithm may be used by device 110 to generate the challenge data based on the response data (or vice-versa).

Many different manufacturers make hardware security modules. One example of a particular hardware security module is a Trusted Platform Module (TPM). The most recent specification for the TPM is entitled CG Specification Architecture Overview, version 1.2. This specification is publicly available at the Trusted Computing Group (TCG) website, which, at the time of filing of this application, corresponds to the concatenation of "www," ".trustedcomputinggroup" and ".org."

The TPM is a hardware component with embedded logic that may be incorporated into device 110. In an embodiment wherein the HSM is a TPM, when device 110 is turned on, the TPM causes device to perform a secure boot cycle. During a secure boot cycle, the TPM causes device 110 to run a series of tests based on the logic embedded in the TPM. The series of tests may verify that any aspect of device 110 currently conforms to an expected state that is stored in the embedded logic of the TPM. For example, the series of tests may verify that the security state or the operational state of device 110 conforms to an expected state that is stored in the embedded logic of the TPM.

In an embodiment, if all of the series of tests performed by the TPM during the secure boot cycle pass, then the TPM allows device 110 to access an algorithm stored by the TPM. In an embodiment, the algorithm may correspond to a public key which device 110 may use to encrypt data. As an example, if all of the series of tests performed by the TPM during the secure boot cycle pass, then device 110 may have access to the public key; alternately, if any of the series of tests performed by the TPM during the secure boot cycle fail, then device 110 would not have access to the public key. In an embodiment, device 110 may use this public key to encrypt the response data to create the challenge data.

In an embodiment, device 110 may provide the challenge data to the user in the same manner in which device 110 received the request in step 210. In other words, if the user submitted the request of step 210 using a graphical user interface provided by device 110, then in step 220 device 110 may provide the challenge data to the user by displaying the challenge data on the graphical user interface. On the other hand, if the user submitted the request of step 210 using client 120, then in step 220 device 110 may provide the challenge data to the user by sending the challenge data to client 120 over communications link 132. After the performance of step 220, processing proceeds to step 230.

In step 230, the user obtains response data from the third party. Since the only way in which the user may obtain response data is from the third party, if the user is in possession of response data, then that evidences that the third party has authenticated the user.

In an embodiment, the user contacts the third party to obtain the response data. The user may contact the third party using a variety of different mechanisms. For example, the user may make a telephone call to a contact person of the third party. In such an embodiment, a telephone number may be displayed on device 110 or the user may configure a user interface provided by device 110 to make the telephone call using device 110 (for example, device 110 may be equipped with a speaker phone).

Alternately, the user may communicate with the third party by sending an electronic communication to a server associated with the third party. To illustrate, in an embodiment, third party device 130 may be a web server. In such an embodiment, the user may communicate with the third party by exchanges one or more electronic messages with third party device using either client 120 or a user interface provided by device 110.

The third party may authenticate the user using a variety of different means. In an embodiment, the user may provide the third party with information to assist the third party in authenticating the user. The type of information provided by the user to the third party for purposes of assisting the third party in authenticating the user may include any information that is helpful for the third party to possess in evaluating whether to grant access to device 110 to the user. In an embodiment, the user may provide, to the third party, the challenge data and information identifying the user, such as an employee number, name, or similar identifier. Optionally, the user may also provide, to the third party, information identifying device 110 to the third party, e.g., the user may inform the third party of the serial number of device 110.

After the third party receives any information necessary for the third party to authenticate the user for using device 110, the third party authenticates the user for using device 110. For example, the third party may authenticate the user for using device 110 by validating the identity of the user, and determining whether, based on the identity of the user, the user should be granted access to device 110. Upon the third party successfully authenticating the user, the third party providing the response data to the user.

The third party may generate the response data based on the challenge data provided by the user. The third party is knowledgeable of how device 110 will generate the response data based on the challenge data. For example, the user may inform the third party about information that uniquely identifies device 110 to the third party. The third party, in turn, may store information that identifies how each device, of a plurality of devices known to the third party, will generate response data, e.g., the third party may store the particular HSM algorithm (would could be a public key) employed by device 110. In this way, by the user identifying device 110 to the third party, the third party can generate, based on the challenge data supplied by the user, the same response data as device 110.

As an example of how a user may obtain response data, a user may view a telephone number of the third party that is posted on device 110. The user may then place a telephone call to the third party using that number. The third party may authenticate the user to verify the identity of the user by asking questions of the user during the telephone conversation, e.g., the third party may ask the user to supply information that only a person who should have access to device 110 should know. As such, the third party may have access to certain information used to authenticate the user. Any mechanism for authenticating users may be employed by the third party to authenticate the user. During the phone conversion, the user may inform the third party of the challenge data. If the user is authenticated by the third party, then the third party may generate the response data by decrypting the challenge data using the private key associated with device 110, and thereafter provide the response data to the user.

As another example of how the user may obtain response data, the user may use client 120 to send an electronic communication to third party device 130, which may be a web server. Client 120 may send, in one or more communications, information to third party device 130 to enable third party device 130 to determine whether to authenticate the user, e.g., client 120 may automatically send the social security number, name, employee number, and/or password to third party device 120. Also, third party device 130 may send a communication to client 120 to request the user to answer one or more authentication questions. The user may use client 120 to send answers to those questions to third party device 120. Client 120 may also send the challenge data to third party device 130. If the user is authenticated by third party device 130, then third party device may generate the response data by employing an algorithm, associated with device 110, on the challenge data. After the user obtains the response data, processing proceeds to step 240.

In step 240, device 110 receives, from the user, the response data. In an embodiment, device 110 may receive the response data, from the user, in the same manner in which device 110 received the request in step 210. For example, the user may submit the response data to device 110 by entering the response data through a graphical user interface provided by device 110 or using client 120. After device 110 receives the response data, processing proceeds to step 250.

In step 250, device 110 verifies that the response data received in step 240 is responsive to the challenge data provided to the user in step 220. In an embodiment, device 110 may determine whether the response data received in step 240 is a decrypted version of the challenge data provided to the user in 220. In such an embodiment, device 110 may attempt to us a private key to decrypt the response data to determine whether the response data is response to the challenge data provided to the user in step 220. In an embodiment, the public key may correspond to the HSM algorithm.

In another embodiment, the response data need not be an encrypted version of the challenge data for the response data to be responsive to the challenge data. For example, any algorithm may be used by device 110 to determine, based on a received set of response data, that the response data indicates that the third party has authenticated the user to gain access to device 110. After device 110 verifies the response data, processing proceeds to step 260.

In step 260, upon device 110 successfully verifying that the response data received in step 240 is responsive to the challenge data provided to the user in step 220, device 110 grants access to the user. In an embodiment, the access granted to the user in step 260 is access to perform a restricted function on device 110. In another embodiment, the access granted to the user in step 260 is access to perform any function on device 110. Thus, the amount of access granted to the user in step 260 may vary from embodiment to embodiment.

In an embodiment, the amount of access granted to the user in step 260 may be configurable. For example, device 110 may store information which may be used to determine how much access to provide to a user who gains access to device using the steps of FIG. 2. Alternatively, several sets of response data may be response to the challenge data provided to the user in step 220. The third party may provide a set of response data to the user that identifies, to device 110, how much access should be given to the user in step 260. To illustrate, if the third party authenticates the user to use any function provided by device 110, the third party may provide a first set of response data that to the user that identifies, to device 110, that the user has been authenticated by the third party to use any function provided by device 110. On the other hand, if the third party authenticates the user to use only certain functions provided by device 110, the third party may provide a second set of response data that to the user that identifies, to device 110, that the user has been authenticated by the third party to use only a reduced number of functions provided by device 110.

In an embodiment, if device 110 does not grant access to the user, then device 110 may offer to the user one or more additional opportunities to enter the response data that is responsive to the challenge data provided to the user in step 220 under the rationale that the user committed a typographical error in submitting the response data to device 110.

Figure 3:
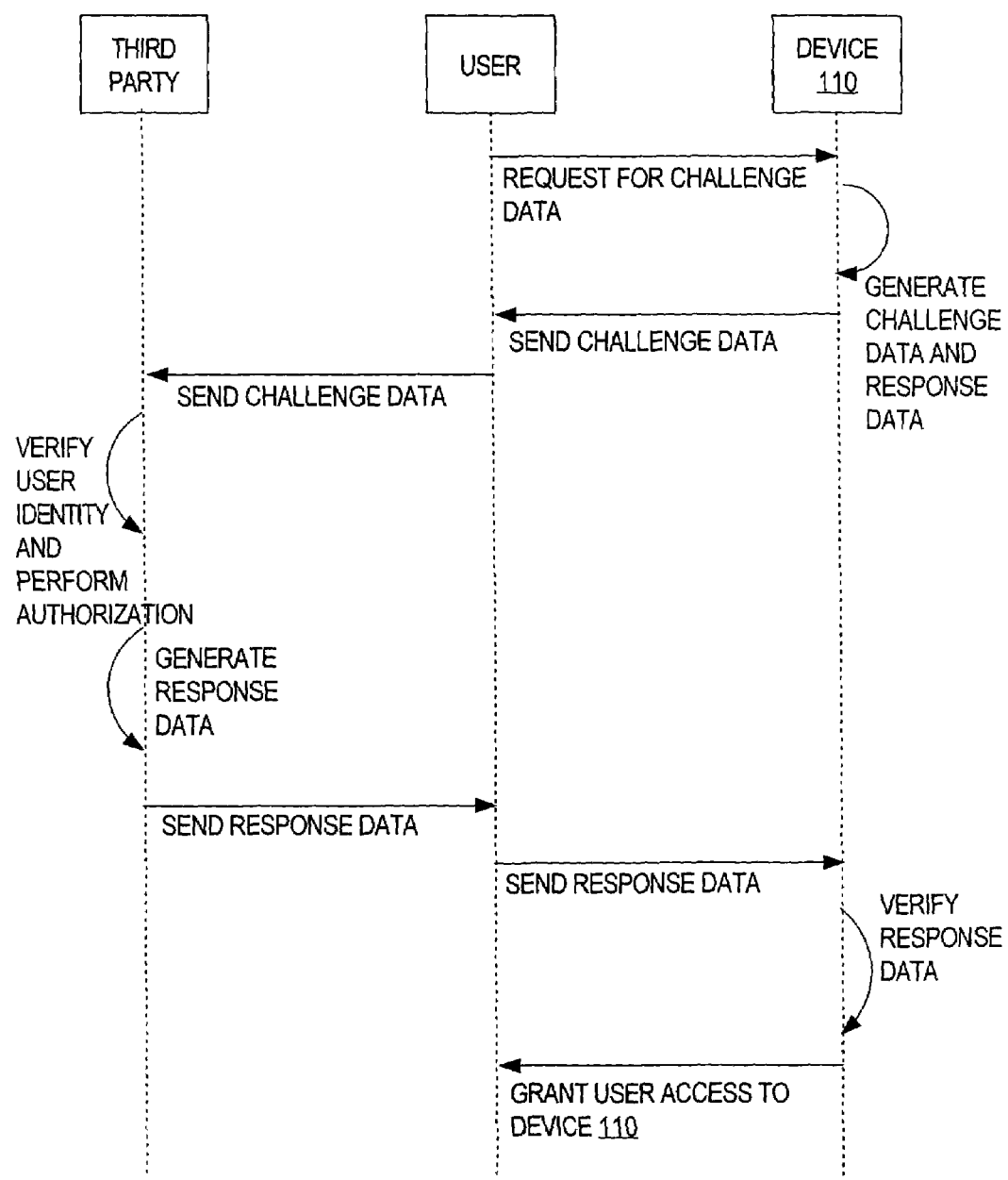
FIG. 3 is an illustration of the actions performed by different entities according to an embodiment of the invention.

FIG. 3 is an illustration of the actions performed by different entities according to an embodiment of the invention. The actions performed by the third party, the user, and device 110 are described above with reference to FIG. 2. As shown in FIG. 2, the third party cannot directly interact with device 110, but instead, the third party may interact with the user requesting authentication; if the user is authenticated, the third party may provide the response data to the user so that the user may access device 110.

Implementing Mechanisms

Figure 4:
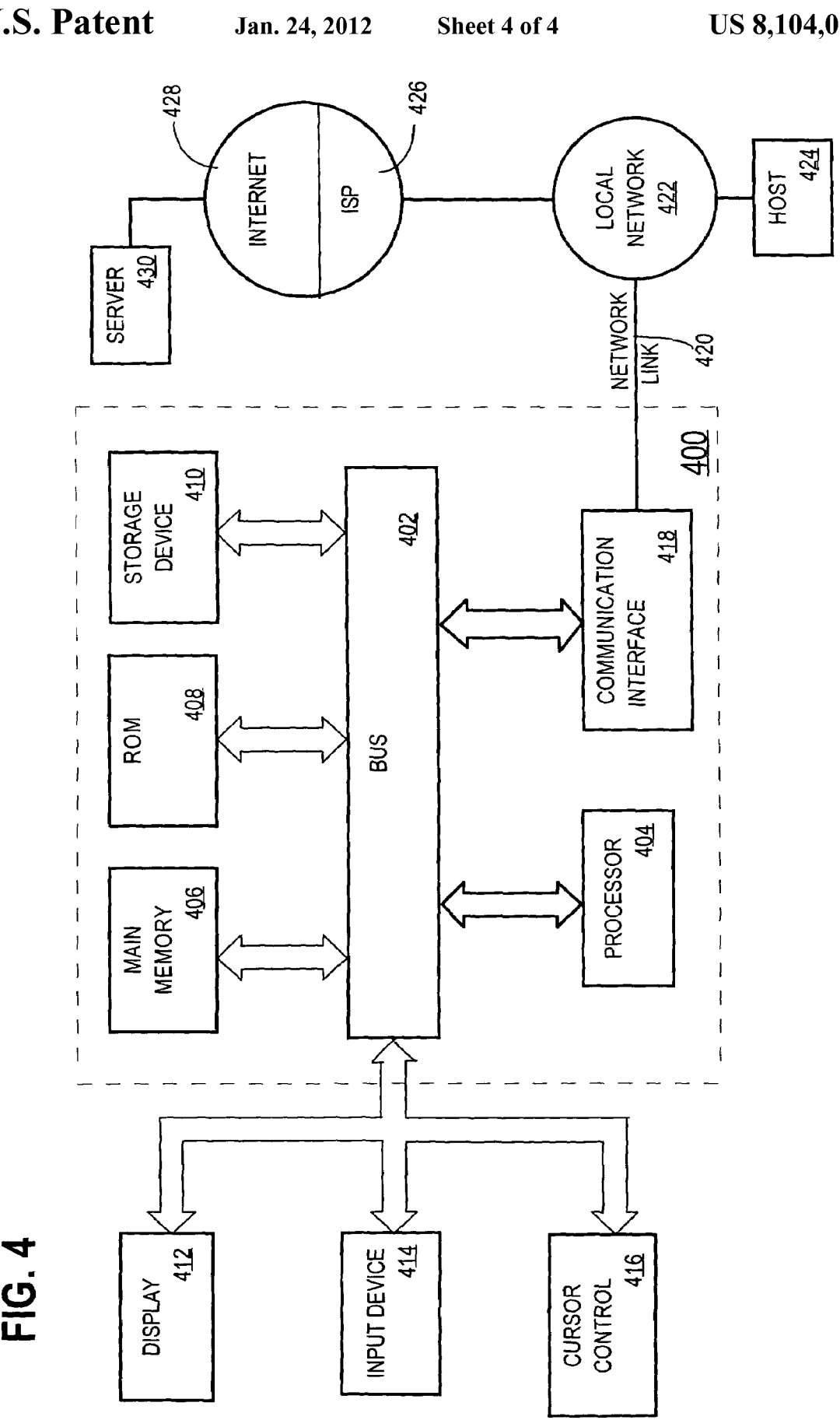
FIG. 4 is a block diagram that illustrates a computer system upon which an embodiment of the invention may be implemented.

In an embodiment, device 110, client 120, and third party device may each be implemented on or using a computer system. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising: in response to a device receiving a request, from a requestor, for challenge data, the device generating the challenge data and providing the challenge data to the requestor, wherein the device makes a plurality of functions available to requestors; the device receiving response data from the requestor, wherein the response data indicates one or more functions, from the plurality of functions that the device makes available to requestors, that the requestor is authorized to use on the device and wherein the requestor obtains the response data by: the requestor providing, to a third party that is different than the requestor and the device, the challenge data that the requestor obtained from the device and identification information that identifies the requestor, the third party authenticates, based upon the challenge data that the device provided to the requestor and the identification information, the requestor to use the one or more functions, from the plurality of functions that the device makes available to requestors, and upon the third party successfully authenticating the requestor to use the one or more functions, from the plurality of functions that the device makes available to requestors, the third party providing the response data to the requestor, wherein the response data indicates the one or more functions that the requestor is authorized to use on the device; in response to receiving the response data from the requestor, the device verifying the response data; and upon the device successfully verifying the response data, the device allowing the requestor to use the one or more functions indicated by the response data provided by the third party to the requestor.

2. The method of claim 1, wherein the third party is one or more of: a manufacturer of the device, a dealer of the device, a distributor of the device, a value-added reseller of the device, a leasing company of the device, a service provider of the device, and an employer of the requestor.

3. The method of claim 1, wherein the requestor further provides information identifying the device to the third party, and wherein the third party generates the response data based, at least in part, upon the information identifying the device to the third party.

4. The method of claim 1, wherein the device is one of: a multi-function peripheral, a facsimile machine, a printer, a copier, a personal computer, and an embedded computer.

5. The method of claim 1, wherein the requestor provides, to the third party, the challenge data and the identification information for the requestor in a telephone call.

6. The method of claim 1, wherein the requestor provides, to the third party, the challenge data and the identification information for the requestor by the requestor sending an electronic communication to a server associated with the third party.

7. The method of claim 1, wherein the request, from the requestor, is issued by the requestor from a client external to the device.

8. A non-transitory computer-readable medium storing instructions which, when processed by one or more processors, causes: in response to a device receiving a request, from a requestor, for challenge data, the device generating the challenge data and providing the challenge data to the requestor, wherein the device makes a plurality of functions available to requestors; the device receiving response data from the requestor, wherein the response data indicates one or more functions, from the plurality of functions that the device makes available to requestors, that the requestor is authorized to use on the device and wherein the requestor obtains the response data by: the requestor providing, to a third party that is different than the requestor and the device, the challenge data that the requestor obtained from the device and identification information that identifies the requestor, the third party authenticates, based upon the challenge data that the device provided to the requestor and the identification information, the requestor to use the one or more functions, from the plurality of functions that the device makes available to requestors, and upon the third party successfully authenticating the requestor to use the one or more functions, from the plurality of functions that the device makes available to requestors, the third party providing the response data to the requestor, wherein the response data indicates the one or more functions that the requestor is authorized to use on the device; in response to receiving the response data from the requestor, the device verifying the response data; and upon the device successfully verifying the response data, the device allowing the requestor to use the one or more functions indicated by the response data provided by the third party to the requestor.

9. The non-transitory computer-readable medium of claim 8, wherein the third party is one or more of: a manufacturer of the device, a dealer of the device, a distributor of the device, a value-added reseller of the device, a leasing company of the device, a service provider of the device, and an employer of the requestor.

10. The non-transitory computer-readable medium of claim 8, wherein the requestor further provides information identifying the device to the third party, and wherein the third party generates the response data based, at least in part, upon the information identifying the device to the third party.

11. The non-transitory computer-readable medium of claim 8, wherein the device is one of: a multi-function peripheral, a facsimile machine, a printer, a copier, a personal computer, and an embedded computer.

12. The non-transitory computer-readable medium of claim 8, wherein the requestor provides, to the third party, the challenge data and the identification information for the requestor in a telephone call.

13. The non-transitory computer-readable medium of claim 8, wherein the requestor provides, to the third party, the challenge data and the identification information for the requestor by the requestor sending an electronic communication to a server associated with the third party.

14. The non-transitory computer-readable medium of claim 8, wherein the request, from the requestor, is issued by the requestor from a client external to the device.

15. An apparatus, comprising: one or more processors; and a non-transitory computer-readable medium storing instructions, which when processed by the one or more processors, causes: in response to a device receiving a request, from a requestor, for challenge data, the device generating the challenge data and providing the challenge data to the requestor, wherein the device makes a plurality of functions available to requestors; the device receiving response data from the requestor, wherein the response data indicates one or more functions, from the plurality of functions that the device makes available to requestors, that the requestor is authorized to use on the device and wherein the requestor obtains the response data by: the requestor providing, to a third party that is different than the requestor and the device, the challenge data that the requestor obtained from the device and identification information that identifies the requestor, the third party authenticates, based upon the challenge data that the device provided to the requestor and the identification information, the requestor to use the one or more functions, from the plurality of functions that the device makes available to requestors, and upon the third party successfully authenticating the requestor to use the one or more functions, from the plurality of functions that the device makes available to requestors, the third party providing the response data to the requestor, wherein the response data indicates the one or more functions that the requestor is authorized to use on the device; in response to receiving the response data from the requestor, the device verifying the response data; and upon the device successfully verifying the response data, the device allowing the requestor to use the one or more functions indicated by the response data provided by the third party to the requestor.

16. The apparatus of claim 15, wherein the third party is one or more of: a manufacturer of the device, a dealer of the device, a distributor of the device, a value-added reseller of the device, a leasing company of the device, a service provider of the device, and an employer of the requestor.

17. The apparatus of claim 15, wherein the requestor further provides information identifying the device to the third party, and wherein the third party generates the response data based, at least in part, upon the information identifying the device to the third party.

18. The apparatus of claim 15, wherein the device is one of: a multi-function peripheral, a facsimile machine, a printer, a copier, a personal computer, and an embedded computer.

19. The apparatus of claim 15, wherein the requestor provides, to the third party, the challenge data and the identification information for the requestor in a telephone call.

20. The apparatus of claim 15, wherein the requestor provides, to the third party, the challenge data and the identification information for the requestor by the requestor sending an electronic communication to a server associated with the third party.

21. The apparatus of claim 15, wherein the request, from the requestor, is issued by the requestor from a client external to the device.

* * * * *